US012375001B2

(12) United States Patent
Lu

(10) Patent No.: US 12,375,001 B2
(45) Date of Patent: Jul. 29, 2025

(54) CONTROLLER FOR A VOLTAGE CONVERTER

(71) Applicant: TEXAS INSTRUMENTS INCORPORATED, Dallas, TX (US)

(72) Inventor: Bing Lu, Bedford, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 271 days.

(21) Appl. No.: 18/050,078

(22) Filed: Oct. 27, 2022

(65) Prior Publication Data

US 2024/0146198 A1 May 2, 2024

(51) Int. Cl.
*H02M 3/335* (2006.01)
(52) U.S. Cl.
CPC .............................. *H02M 3/33569* (2013.01)
(58) Field of Classification Search
CPC .................................................. H02M 3/33569
See application file for complete search history.

(56) References Cited

U.S. PATENT DOCUMENTS

| | | | |
|---|---|---|---|
| 2012/0300503 A1* | 11/2012 | Yang | H02M 3/3376 363/21.02 |
| 2014/0146579 A1* | 5/2014 | Yang | H02M 3/33523 363/21.16 |
| 2014/0375361 A1* | 12/2014 | Ausseresse | H02M 1/088 327/109 |
| 2016/0344294 A1 | 11/2016 | Zhang | |
| 2017/0222643 A1* | 8/2017 | Ivankovic | H03K 17/691 |

FOREIGN PATENT DOCUMENTS

CN         106452041 B         2/2019

OTHER PUBLICATIONS

International Search Report mailed Jan. 31, 2024.

* cited by examiner

*Primary Examiner* — Rafael O Leon De Domenech
(74) *Attorney, Agent, or Firm* — Charles F. Koch; Frank D. Cimino

(57) ABSTRACT

A controller integrated circuit for controlling a voltage converter. The controller IC includes a transistor control driver terminal and a power terminal. A driver has a driver input, a driver output, and a driver supply voltage input. The driver output is coupled to the transistor control driver terminal, and the driver supply voltage input is coupled to the power terminal. Logic has a first logic output and a second logic output. A first transistor has a first control input, a first current terminal, and a second current terminal. The first logic output is coupled to the first control input, and the first current terminal is coupled to the power terminal. A second transistor has a second control input, a third current terminal, and a fourth current terminal. The second logic output is coupled to the second control input, and the third current terminal couples to the transistor control driver terminal.

10 Claims, 4 Drawing Sheets

CONTROLLER FOR A VOLTAGE CONVERTER

BACKGROUND

An electric vehicle (EV) includes a battery pack that produces a relatively high direct current (DC) voltage. The battery packs of some EVs produce a DC voltage of 400V. The EV battery packs are trending towards even higher voltages (e.g., 800V). A use of the battery pack's voltage is to drive a traction inverter, which in some cases produces a three-phase time-varying voltage (e.g., a sinusoidal voltage and current) to a three-phase motor. The traction inverter causes the motor to turn. The motor is coupled to one or both axles of the EV. The motor turning causes the axles to turn to cause the EV's wheels to turn.

At least some EVs have a "tow mode," To safely tow the EV, the EV is put into the tow mode, which may disconnect the battery pack. However, when towing an EV, at least two of the wheels turn as they EV is being pulled by a tower. The turning wheels cause the motor to turn, which then acts as an electrical generator. A voltage is generated by the motor on the main high-voltage bus. The voltage generated by the motor may be much smaller than the EV's battery pack. In one example, the motor-generated voltage is in the range of, for example, 40V to 60V, while the battery pack's voltage may be 400V, 800V, etc.

A DC-to-DC voltage converter is included in the EV to convert the relatively high battery pack voltage to much smaller voltage (e.g., 12V to 20V) to power the control electronics within the EV (e.g., the EV's main electronic control unit). A type of voltage converter used in at least some EVs is a flyback voltage converter which converts the DC put voltage to a smaller DC output voltage. If the EV is in the tow mode and a motor-generated voltage turns on the EV's main electronic control unit, the electronic control unit may configure the traction inverter into a safe mode (e.g., shorting each of the three phases of the motor) to prevent the motor from further generating a higher voltage.

The DC input voltage of the flyback voltage converter thus should have a wide range from, for example, 40V to 800V. A flyback converter also should include circuitry for rapidly generating a relatively low bias voltage (compared to the 800V battery pack voltage) to power on the flyback converter's controller. The bias voltage generation capability of such flyback converters should rapidly generate the bias voltage despite a wide range of input voltages.

SUMMARY

A controller integrated circuit for controlling a voltage converter. The controller IC includes a transistor control driver terminal and a power terminal. A driver has a driver input, a driver output, and a driver supply voltage input. The driver output is coupled to the transistor control driver terminal, and the driver supply voltage input is coupled to the power terminal. Logic has a first logic output and a second logic output. A first transistor has a first control input, a first current terminal, and a second current terminal. The first logic output is coupled to the first control input, and the first current terminal is coupled to the power terminal. A second transistor has a second control input, a third current terminal, and a fourth current terminal. The second logic output is coupled to the second control input, and the third current terminal couples to the transistor control driver terminal.

DETAILED DESCRIPTION

Figure 1:
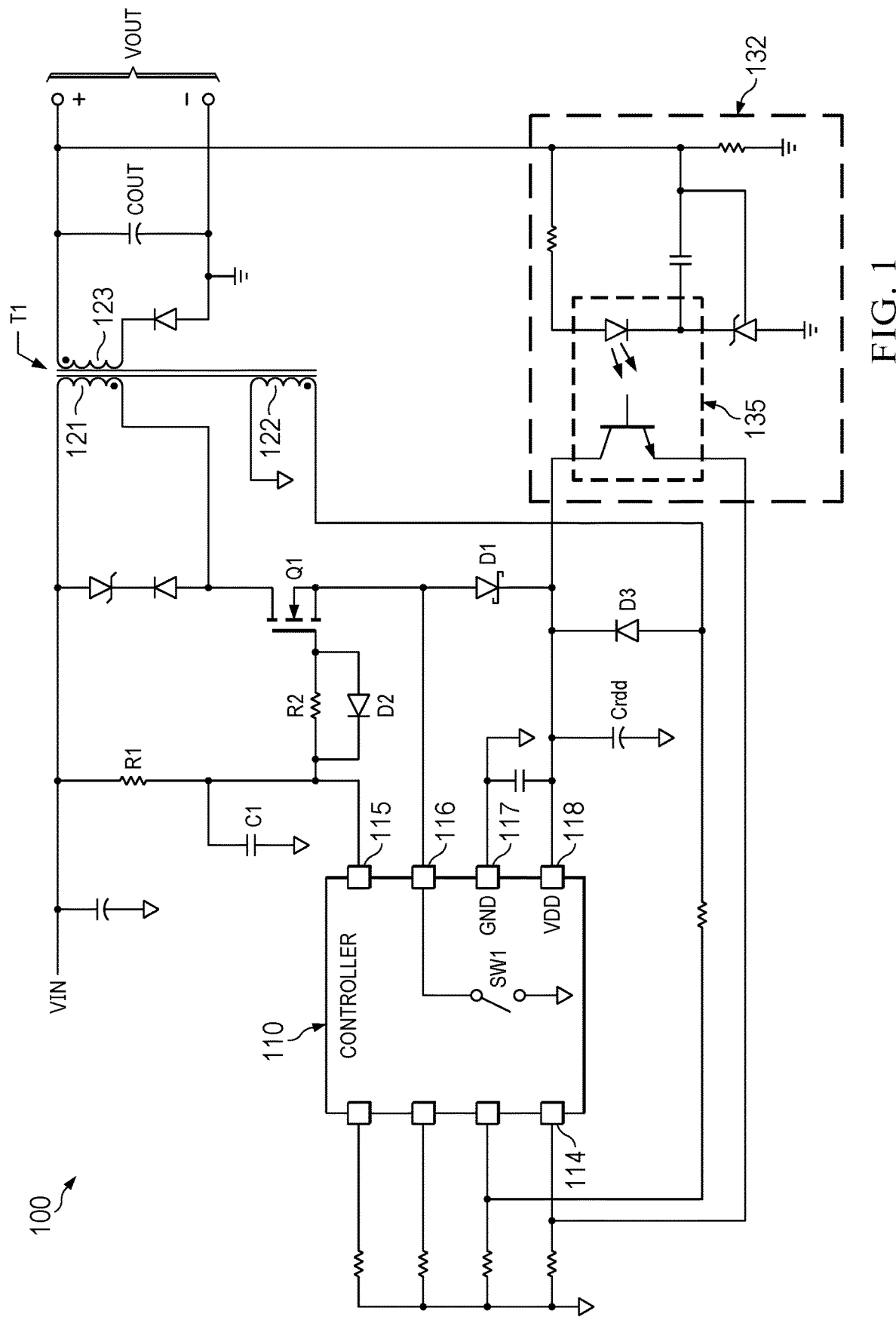
FIG. 1 is a schematic of a DC-to-DC converter, in accordance with an example.

The same reference numbers or other reference designators are used in the drawings to designate the same or similar (either by function and/or structure) features.

FIG. 1 is a schematic of a DC-to-DC voltage converter 100. The voltage converter 100 in this example is a flyback converter which converts a DC input voltage, VIN, to a DC output voltage, VOUT. In one example, the magnitude of VOUT is less than the magnitude of VIN. Among other components, the flyback converter 100 includes a controller 110, a transformer T1, a transistor Q1, and a feedback circuit 132. Transistor Q1 is an n-channel field effect transistor (NFET) but transistor Q1 can be implemented as any of a variety of other types of transistors. The controller 110 controls the ON and OFF state of transistor Q1. The feedback circuit 132 includes an opto-coupler 135. The feedback circuit is coupled to the output terminals 151, 152 of the converter 100 and thus receives the output voltage VOUT. A scaled version of VOUT is transferred through the opto-coupler to a pin 114 of the controller 110 to provide a signal indicative of the magnitude of VOUT. The controller 110 controls the timing of the ON and OFF state of transistor Q1 to maintain VOUT at a regulated level (e.g., with a target level of output voltage ripple).

The controller 110 also includes pins 115-118. VDD pin 118 receives an operating voltage, Vdd, to power the controller 110. Pin 117 is a ground pin. Pin 116 is coupled to the source of transistor Q1 and to the anode of diode (e.g., a Zener diode) D1. A parallel combination of a resistor R2 and a diode D2 is coupled between pin 115 and the gate of transistor Q1. A series connection of resistor R1 and C1 is coupled between VIN and ground. The transformer includes a primary winding 121, an auxiliary winding 122, and a secondary winding 123.

The input voltage VIN may be too large to be connected to VDD pin 118 of the controller. For example, VIN may be 400V, 800V, etc. and the maximum permitted magnitude for the controller's VDD pin may be 12V, 15V, etc. The controller 110 implements a start-up process to cause the voltage on the VDD pin 118 to increase from 0V to a suitable operating voltage to power the controller 110. The controller 110 includes an internal switch SW1 (e.g., a transistor) that is coupled, through pin 116, between the source of transistor Q1 and ground. During the start-up process, logic within the controller opens (turns OFF) switch SW1. With switch SW1 open, current through the primary winding 121 flows through transistor Q1 and diode D1 to charge capacitor Cvdd. The voltage across capacitor Cvdd is coupled to the VDD pin 118 of the controller 110. As capacitor Cvdd charges, its voltage increases above the minimum operating voltage of the controller, and an under-voltage lockout (UVLO) function within the controller changes the logic state of an internal UVLO signal to release the controller from its reset state. At this point, the voltage pin 115 is set to a fixed voltage level (e.g., by an internal, reversed-biased Zener diode, not shown).

The fixed voltage level on pin 115 is coupled through resistor R2 to the gate of transistor Q1. In this configuration, the gate of transistor Q1 is coupled to fixed voltage. Upon the controller 110 being released from its reset state, switch SW1 is used to turn ON and OFF transistor Q1.

Figure 3:
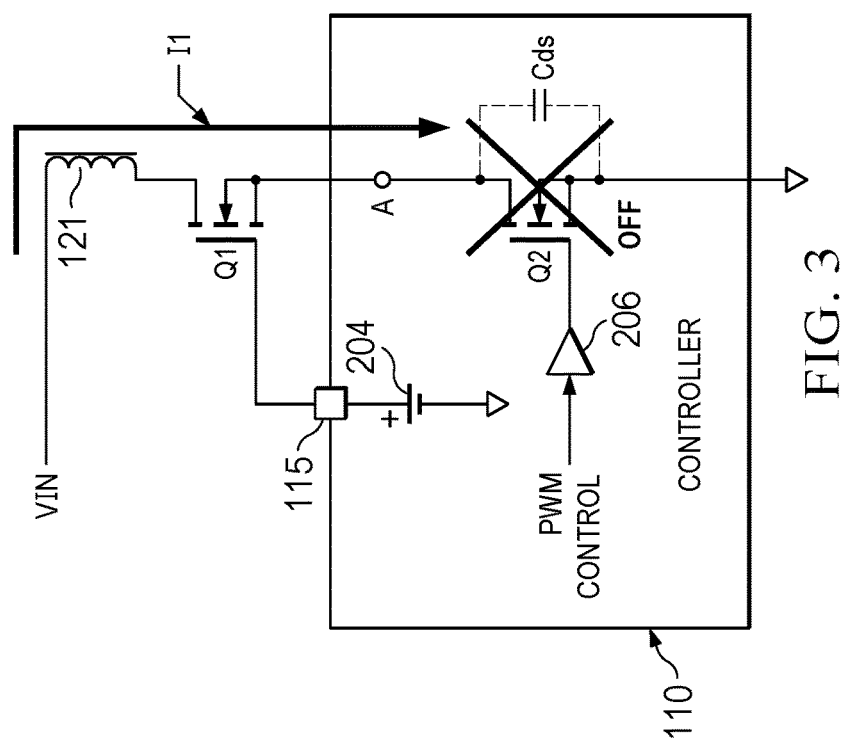
FIG. 3 is a schematic illustrating how the main power transistor of the converter of FIG. 1 is turned OFF, in accordance with an example.
Figure 2:
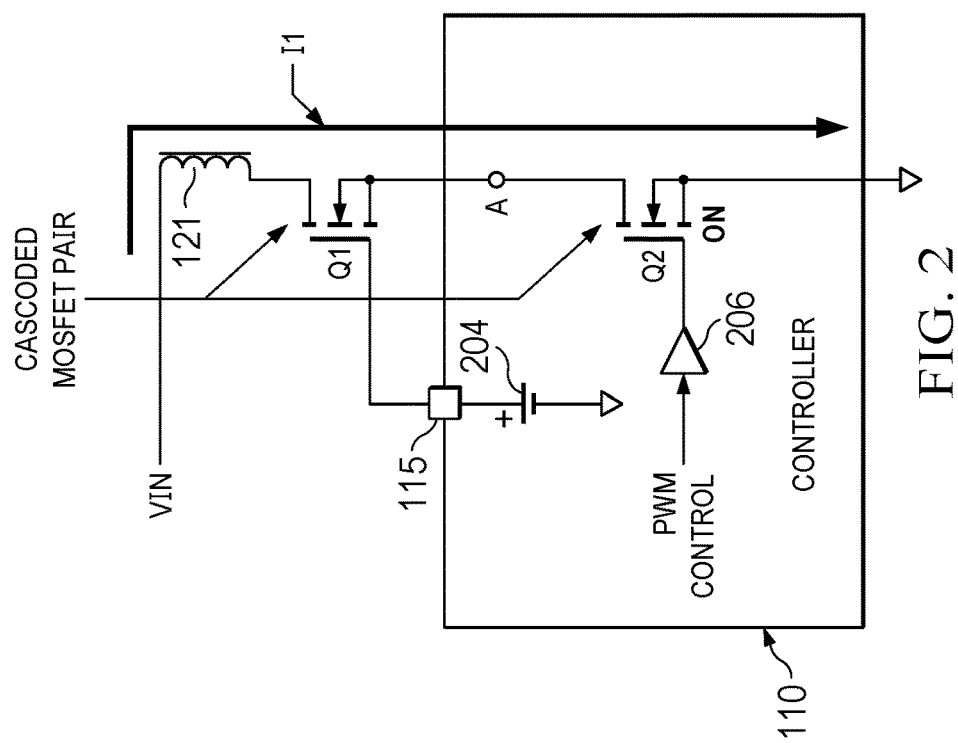
FIG. 2 is a schematic illustrating how the main power transistor of the converter of FIG. 1 is turned ON, in accordance with an example.

FIGS. 2 and 3 illustrate the behavior of the converter with switch SW1 ON (FIG. 2) and with switch SW1 OFF (FIG. 3). FIGS. 2 and 3 illustrate the fixed voltage 204 provided to the gate of transistor Q1 (resistor R2 is not shown). Switch SW1 is implemented in this example as an NFET Q2. The controller 110 generates a pulse width modulation (PWM) control signal to the gate of transistor Q2 (through a driver 206). When the PWM control signal is logic high, transistor Q2 turns ON. When the PWM control signal is logic low, transistor Q2 turns OFF.

Referring to FIG. 2, with transistor Q2 ON, the source of transistor Q1 is pulled down to approximately the ground potential. With the gate voltage of transistor Q1 at a fixed level, the gate-to-source voltage (Vgs) of transistor Q1 exceeds its threshold voltage and transistor Q1 turns ON. Current I1 flows through the primary winding 121 and transistors Q1 and Q2 to ground.

Transistor Q2 has a parasitic capacitance Cds, which is shown in FIG. 3. With transistor Q2 is OFF, current I1 continues to flow through transistor Q1 and parasitic capacitance Cds charges. Node A is the connection between the source of transistor Q1 and the drain of transistor Q2. As capacitance Cds charges, the voltage on node A increases. Eventually, the voltage on node A is large enough that the Vgs of transistor Q1 is less than its threshold voltage. When this happens, transistor Q1 turns OFF.

The rate at which the voltage on node A increases is proportional to the magnitude of current I1, which can be quite large. The rate of change of the node A voltage is thus large as well. The large rate of change of the node A voltage between the primary winding 121 (and inductor) and capacitance Cds causes ringing on node A. The ringing voltage on node A can be large enough to damage transistors Q1 and/or Q2, and cause electromagnetic interference (EMI) for circuits apart from the voltage converter 100. Certain features can be added to the converter to attempt to mitigate the ringing. For example, a ferrite bead can be coupled to the gate of the transistor Q1. In another example, a capacitor can be coupled between pins 116 and 117 (ground). In yet another example, a resistor can be added between the gate of transistor Q1 and the anode of diode D2. In some cases, these mitigation techniques do not work. The embodiment described below may solve this problem.

Figure 4:
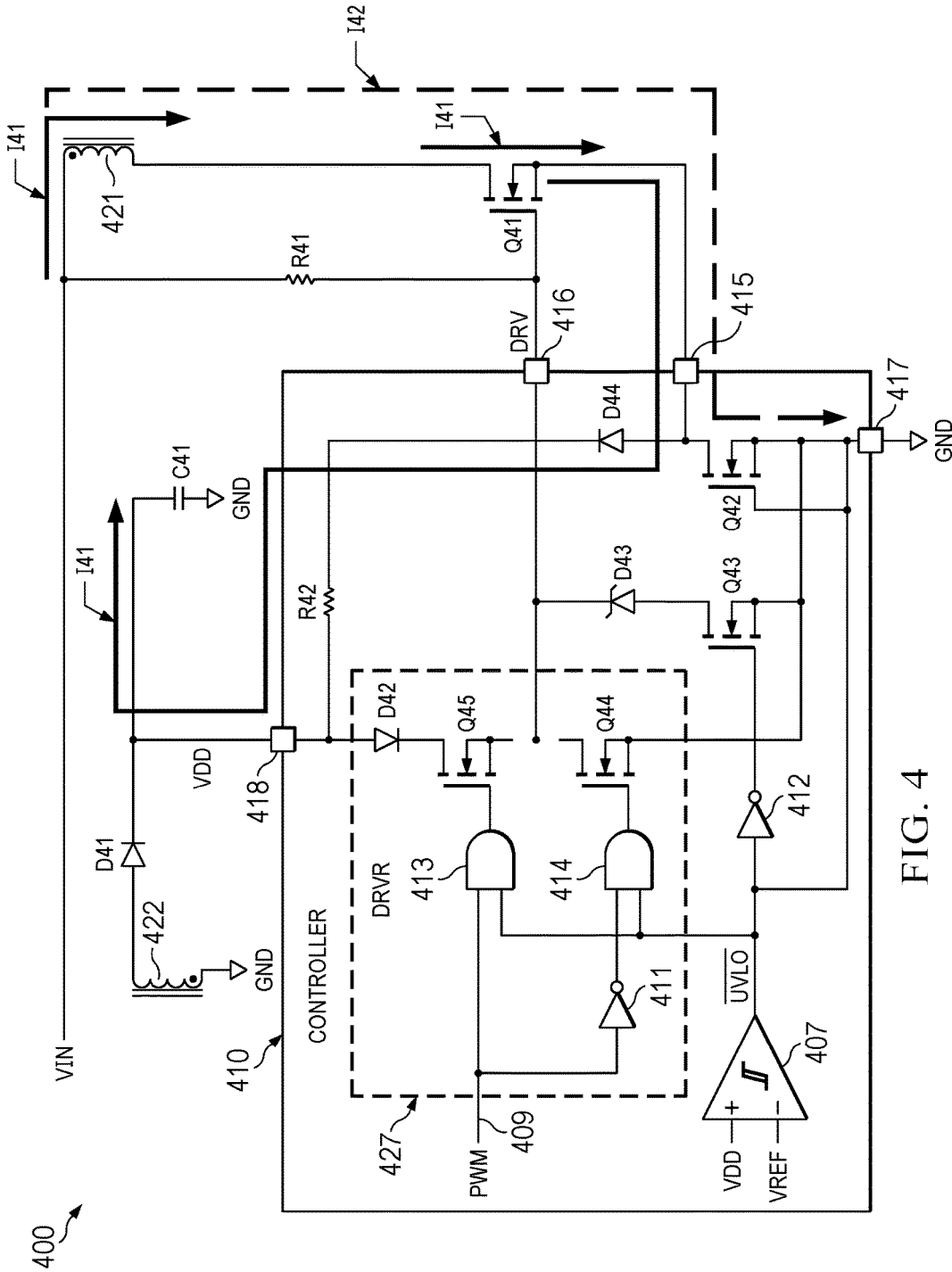
FIG. 4 is a schematic of a DC-to-DC converter, in accordance with another example.

FIG. 4 is a schematic of an example flyback DC-to-DC converter 400 that includes a controller 410, diode D41, capacitor C41, resistor R41, transistor Q41, and a transformer including primary winding 421 and auxiliary winding 422 (the secondary winding of the transformer and the circuit connected thereto are not shown for convenience). The controller has pins 415, 416, 417, and 418. Pin 417 is coupled to ground. Pin 418 receives the operating voltage, VDD. Transistor Q41 is an NFET in this example, and its source is coupled to pin 415 of the controller 410. The gate of transistor Q41 is coupled to the controller's pin 416 (which may be referred to as a transistor control driver pin). Diode D41 is coupled to capacitor C41 in series between the auxiliary winding 422 and ground with the connection between the cathode of diode D41 and capacitor C41 being coupled to pin 418 of the controller 410. The drain of transistor Q41 is coupled to one terminal of the primary winding 421, and VIN is coupled to the other terminal of the primary winding. Resistor R41 is coupled between VIN and the gate of transistor Q41.

In one example, the controller 410 is fabricated as an IC, and diode D41, capacitor C41, resistor R41, transistor Q41, and the transformer are external to the controller 410. The example controller 410 includes inverters 411 and 412, AND gates 413 and 414, a comparator 407, diodes D42, D43, and D44, transistors Q42, Q43, Q44, and Q45, and resistor R42. Comparator 407 and inverter 412 is logic 405 that, at least in part, controls the ON and OFF states of transistor Q42 and Q43. The controller 410 may include additional components such as a PWM generator 403, which generates a PWM signal 409. Transistors Q42-Q45 are NFETs in the example of FIG. 4. The combination of AND gates 413 and 414, inverter 411, transistors Q44 and Q45, and diode D42 form a driver 427 to control the voltage on the gate of transistor Q41. The PWM signal 409 is coupled to an input of AND gate 413 and to an input of inverter 411. Comparator 407 has a positive input and a negative input. The positive input is coupled to VDD, and a reference voltage, VREF, is coupled to the negative input. VREF may be generated by bandgap reference circuit and represents a voltage that is the minimum acceptable level of VDD to properly operate the controller 410. As VDD initially rises, the output signal, UVLO bar, is logic low while VDD is smaller than VREF. Upon VDD reaching VREF, UVLO bar transitions from logic low to logic high. Other types of logic may be used to implement an undervoltage lockout function.

The output of comparator 407 is coupled to inputs of AND gates 413 and 414 and inverter 412. The output of AND gate 413 is coupled to the gate of transistor Q45. The output of AND gate 414 is coupled to the gate of transistor Q44. The output of inverter 412 is coupled to the gate of transistor Q43. The anode of diode D42 is coupled to pin 418 and thus to capacitor C41. The cathode of diode D42 is coupled to the drain of transistor Q45. The source of transistor Q45 is coupled to the drain of transistor Q44 and to pin 416. The source of transistor Q44 is coupled to pin 417 (ground). The sources of transistors Q42 and Q43 are also coupled to pin 417 (ground).

Diode D43 is implemented as a Zener diode. The anode of diode D43 is coupled to the drain of transistor Q43. The cathode of diode D43 is coupled to pin 416, and thus to the source of transistor Q45 and to the drain of transistor Q44. Resistor R42 and diode D44 are coupled in series between pin 418 and the drain of transistor Q42, with the cathode of diode D44 being coupled to resistor R42. The anode of diode D42 is coupled to the drain of transistor Q42 and to the source of transistor Q41 via pin 415.

During start-up, VDD is smaller than VREF, and the comparator 407 responds by forcing UVLO bar logic low, which ensures that transistor Q42 is OFF. With UVLO bar being logic low, the output signal from inverter 412 is logic high thereby turning ON transistor Q43. With transistor Q43 ON, current flows through resistor R41, diode D43, and transistor Q43 to ground. The Zener diode D43 helps to clamp the gate voltage of transistor Q41 to a safe level. The voltage on the gate of transistor Q41 rises eventually turning ON transistor Q41. With transistor Q41 ON, current 141 flows through the primary winding 421, transistor Q41, diode D44, and resistor R42 to charge capacitor C41. The voltage on capacitor C41 is VDD. Capacitor C41 being charged causes voltage VDD to rise.

When VDD exceeds VREF, the comparator 407 forces its output signal, UVLO bar, logic high which causes transistor Q42 to turn ON and (through inverter 412) and transistor Q43 to turn OFF. Transistor Q42 remains ON during normal operation (post start-up), and transistor Q42 is not used to turn ON and OFF external transistor Q41.

With transistor Q42 being ON during normal operation (when VDD is larger than VREF), the source of transistor Q41 is pulled low to approximately ground. Instead of using transistor Q42 to cause transistor Q41 to be turned ON and OFF (as was the case of the use of switch SW1 in FIG. 1 and the corresponding transistor Q2 of FIG. 2 to turn ON and OFF transistor Q1), in FIG. 4 transistor Q41 is turned ON and OFF by changing its gate voltage. The UVLO bar signal is logic high when VDD is larger than VREF and thus one input to AND gates 413 and 414 is logic high. The PWM signal 409 is provided to an input of AND gate 413 and the logical inverse of the PWM signal is provided to an input of AND gate 414. Accordingly, transistor Q45 turns ON (and transistor Q44 turns OFF) responsive to the PWM signal being logic high. Transistor Q44 turns ON (and transistor Q45 turns OFF) responsive to the PWM signal being logic low. When transistor Q45 turns ON, the gate of transistor Q41 is pulled upward towards VDD thereby turning ON transistor Q41. With both transistors Q41 and Q42 being ON (Q42 remains ON during the entirety of the post startup operation of the converter), current 142 flows from the primary winding 421 and through transistors Q41 and Q42 to ground. When transistor Q44 turns ON, the gate of transistor Q41 is pulled downward towards ground thereby turning OFF transistor Q41.

Because transistor Q42 is not turned OFF to turn OFF transistor Q41, no (or much less) ringing occurs on the source and gate of transistor Q41. Accordingly, there is less risk of damage to transistors Q41 and Q42. Further, the voltage converter 400 generates less EMI than for voltage converter 100.

Figure 5:
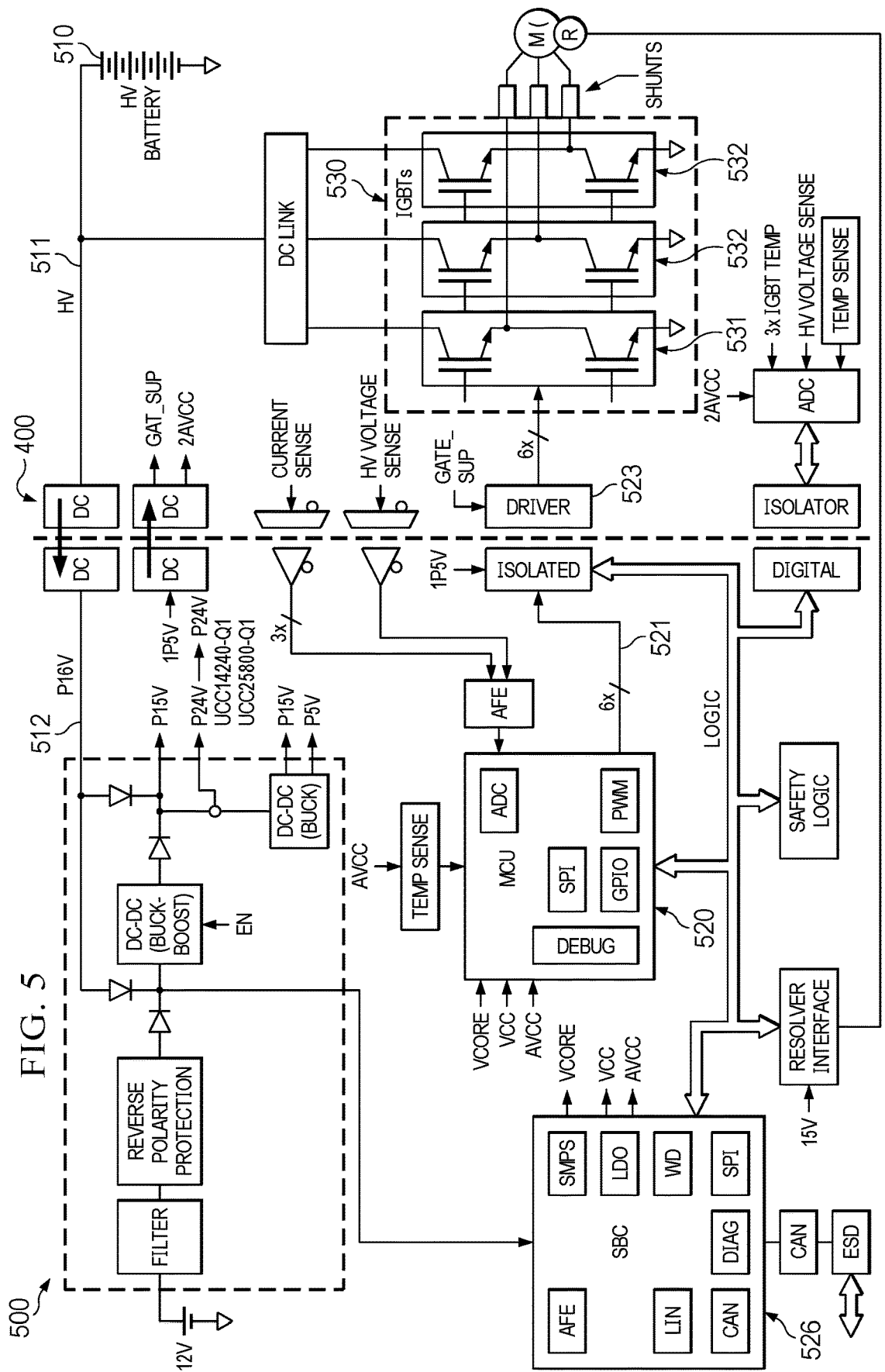
FIG. 5 is a block diagram of a system in which the DC-to-DC converter of FIG. 4 is usable.

FIG. 5 is a block diagram of a system 500 illustrating a use of the voltage converter 400. System 500 represents electronics within an electric vehicle (EV). The system 500 includes a battery pack 510, a microcontroller unit (MCU) 520, a system basis chip (SBC) 526, and a traction inverter 530. The battery pack 510 may comprise multiple cells, and the total voltage of the battery pack may be a substantially high voltage such as 400V, 800V, etc. A higher voltage (HV) power bus 511 couples the battery pack 510 to an input of the voltage converter 400. The voltage converter 400 converts the higher voltage of the battery pack 510 to a lower voltage on a lower voltage (LV) power bus 512. The output voltage from the voltage converter 400 may be a substantially lower voltage than that of the battery pack 510. For example, the output voltage from the voltage converter 400 may be 12V, 15V, 20V, etc. The LV power bus 512 is coupled to a power input of the SBC 526 (via a diode). The SBC 526 generates one or more output voltages based on the voltage from the LV power bus 512. At least one of the output voltages is VCC, which is coupled to a power input of the MCU 520 and is the operating voltage for the MCU.

The MCU 520 generates control signals 521 which are provided to a driver 523. The driver 523 processes the control signals 521 to turn ON and OFF individual transistors of the traction inverter 530. The traction inverter 530 has three phases 531, 532, and 533. Each phase includes a high side transistor coupled to a low side transistor as shown. The phases 531-533 of the traction inverter 530 drive a three-phase motor M1. The motor M1 may be operated to turn the axles and thus the wheels of the EV.

The voltage converter 400 is able to start-up and produce an output voltage over a wide range of input voltages. Such a wide input voltage range is particularly useful in the event that, as explained above, the EV is towed. During towing, at least two of the wheels turn which causes the motor M1 to turn and operate as a generator. As a generator, the motor generates a voltage which may be imposed through the traction inverter 530 onto the HV power bus 511. The voltage generated by the motor during towing is substantially smaller than the voltage of the battery pack. In one example, the voltage imposed on the HV power bus 511 to the input of the voltage converter 400 during towing may be 40V-60V, substantially smaller than the battery pack voltage (e.g., 400V, 800V, etc.). The output voltage produced by the voltage converter 400 onto the LV power bus 512 causes the MCU 520 to power on. Once turned on, the MCU 520 turns ON all three of the low side transistors of the three phases 531-532 to thereby prevent the motor M1 from continuing to generate a voltage on to the HV bus 511. The input voltage VCC to the MCU 520 reduces as well thereby turning off the MCU. This process repeats, with each power cycling of the MCU including shorting the motor to ground through the three low side transistors of the traction inverter 530.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

References may be made herein to a transistor's control input and its current terminals. In the context of a FET, the control input is the gate, and the current terminals are the drain and source. In the context of a BJT, the control input is the base, and the current terminals are the collector and emitter.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A circuit, comprising:
   a first transistor having a first control input, a first current terminal, and a second current terminal;
   a driver having a driver input and a driver output, the driver output coupled to the first control input;
   a capacitor coupled to the second current terminal;
   a second transistor having a second control input, a third current terminal, and a fourth current terminal, the third current terminal coupled to the second current terminal, and the fourth current terminal coupled to a ground terminal; and
   logic coupled to the second control input;
   wherein the driver includes:
      a first AND gate having a first AND gate input, a second AND gate input, and a first AND gate output, the driver input coupled to the first AND gate input, and the logic coupled to the second AND gate input;
      a second AND gate having a third AND gate input, a fourth AND gate input, and a second AND gate output, the driver input coupled to the third AND gate input, and the logic coupled to the fourth AND gate input;
      a third transistor having a third control input and fifth and sixth current terminals, the first AND gate output coupled to the third control input; and
      a fourth transistor having a fourth control input and seventh and eighth current terminals, the second AND gate output coupled to the fourth control input, and the sixth current terminal coupled to the seventh current terminal and to the first control input.

2. The circuit of claim 1, further comprising a transformer coupled to the first current terminal.

3. The circuit of claim 1, wherein the circuit is a flyback voltage converter.

4. The circuit of claim 1, wherein the logic includes a comparator.

5. The circuit of claim 4, wherein the comparator has a first comparator input capable of receiving a supply voltage, and the comparator has a second comparator input capable of receiving a reference voltage.

6. The circuit of claim 5, wherein the comparator has a comparator output, and the logic comprises an inverter having an inverter input coupled to the comparator output, and the inverter has an inverter output coupled to the second control input.

7. An integrated circuit (IC), comprising:
   a transistor control driver terminal;
   a power terminal;
   a driver having a driver input, a driver output, and a driver supply voltage input, the driver output coupled to the transistor control driver terminal, and the driver supply voltage input coupled to the power terminal;
   logic having a first logic output and a second logic output;
   a first transistor having a first control input, a first current terminal, and a second current terminal, the first logic output coupled to the first control input, and the first current terminal coupled to the power terminal; and
   a second transistor having a second control input, a third current terminal, and a fourth current terminal, the second logic output coupled to the second control input, the third current terminal coupled to the transistor control driver terminal;
   wherein the driver includes:

a first AND gate having a first AND gate input, a second AND gate input, and a first AND gate output, the logic coupled to the second AND gate input;

a second AND gate having a third AND gate input, a fourth AND gate input, and a second AND gate output, the logic coupled to the fourth AND gate input;

a third transistor having a third control input and fifth and sixth current terminals, the first AND gate output coupled to the third control input; and a fourth transistor having a fourth control input and seventh and eighth current terminals, the second AND gate output coupled to the fourth control input, and the sixth current terminal coupled to the seventh current terminal and to the transistor driver control terminal.

8. The IC of claim 7, wherein the IC is capable of controlling a flyback voltage converter.

9. The IC of claim 7, wherein the logic comprises a comparator.

10. The IC of claim 9, wherein the comparator has a first comparator input capable of receiving a supply voltage, and the comparator has a second comparator input capable of receiving a reference voltage.

\* \* \* \* \*